May 23, 1961 D. L. McKINLEY 2,985,515
FLUIDIZED SOLIDS CONTACTING SYSTEM
Filed March 5, 1958
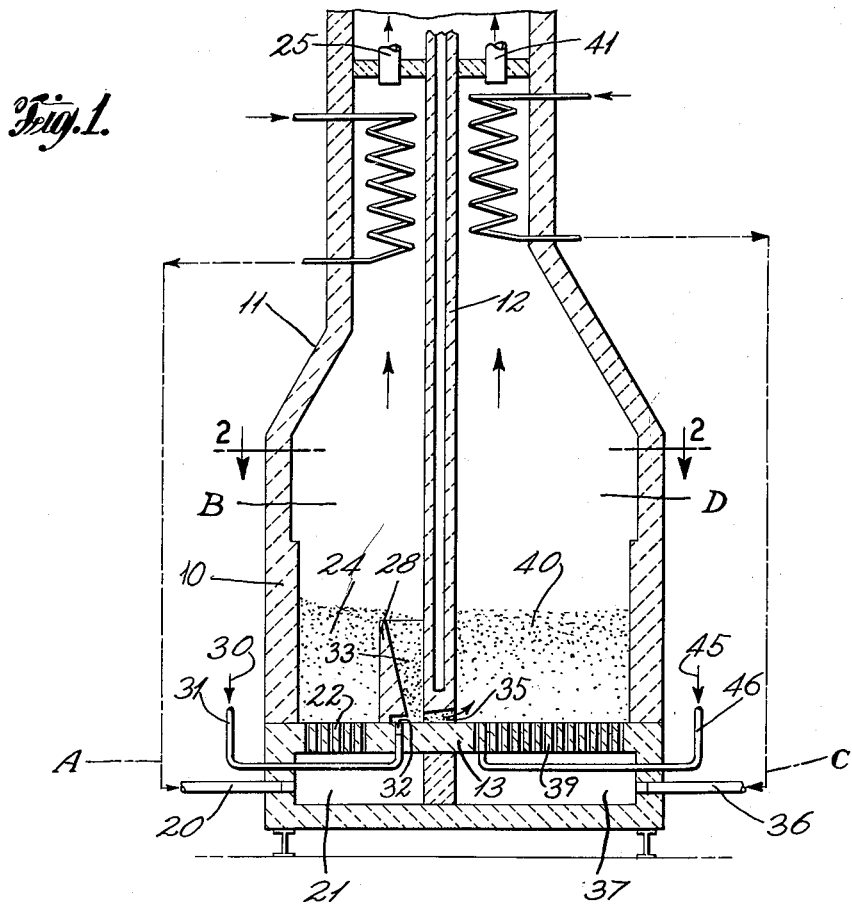
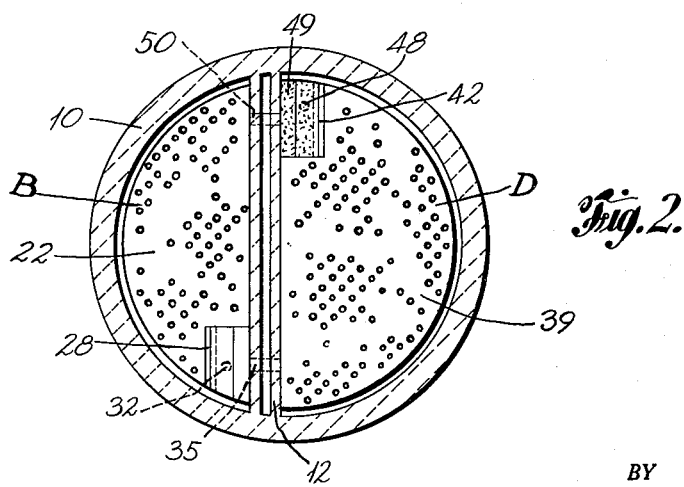
INVENTOR.
DAVID L. McKINLEY
BY
J. Hart Evans
ATTORNEY United States Patent Office 2,985,515
Patented May 23, 1961

2,985,515
FLUIDIZED SOLIDS CONTACTING SYSTEM
David L. McKinley, Nitro, W. Va., assignor to Union Carbide Corporation, a corporation of New York
Filed Mar. 5, 1958, Ser. No. 719,282
1 Claim. (Cl. 23—284)

This invention relates to a fluidized solids contacting system. In one aspect, this invention relates to an improved method and means for transferring solids between fluidized beds. In another aspect, this invention relates to an apparatus for converting gaseous materials into more valuable products at high temperatures. In a particular aspect, this invention relates to the production of hydrogen by thermal decomposition of hydrocarbons.

The increasing use of material of low hydrogen content such as oil residues, coal tars and coals as chemical raw materials will necessitate the increasing use of catalytic and non-catalytic hydrogenation and hydrogen-treating processes. The economy of these processes is dependent upon the availability of hydrogen.

Large quantities of gases containing principally methane and hydrogen are produced as by-products from hydrogenation, coal carbonization, and other processes. These gases contain too low a hydrogen content to constitute a source of hydrogen for hydrogenation and hydrogen-treating processes and, consequently, must be sold for fuel value only. If a suitable means were available for conducting extreme temperature conversion of gaseous materials on a commercial scale, then these by-product gas streams could be converted to high hydrogen content gas in a practical manner by heating to 1100°–1500° C.

The production of hydrogen by high temperature cracking of hydrocarbons is only one example of the need for a means for conducting extreme temperature conversion of gaseous materials on a commercial scale.

The economically most desirable systems for conversion of gaseous materials involve a fluidized solids mode of operation. The present commercial fluid bed conversion systems are used in the petroleum and related industries for the catalytic cracking of hydrocarbons at temperatures in the 500° to 600° C. range. Unfortunately, the methods which are used for circulating and controlling the rate of circulation of fluidized solids are not easily adaptable to modifications in design and changes in construction materials as would be necessary for extreme temperature operation.

In conventional fluid bed catalytic cracking units, the circulating powdered solids overflow from one of the fluid beds into a downflow solids conduit or downcomer well and the overflow solids are kept in a fluidized condition in the downcomer well. The fluidized solids flow from the bottom of the downcomer well into the bottom of another well or riser pipe through which gas is flowing upward at a high velocity. This high velocity gas stream entrains the solids in a highly diluted phase and carries it to the adjoining fluid bed. The direction of flow of the solids is established by the difference in density between the fluidized solids in the downcomer well and the solids flowing in dilute phase in the riser pipe. The solids flow rate is generally regulated by a mechanical valve, e.g., a slide valve, close to the outlet of the downcomer pipe.

In such an operation, the erosion of the riser pipe by the solids in the high velocity gas stream is severe even at 500° to 600° C. This serious erosion problem would be prohibitive for an extreme temperature process in which the riser pipe would have to be a refractory lined duct operating at an inside wall temperature of 1100° to 1500° C. or higher. Further, when extreme temperatures are involved, the commercially available metals are not satisfactory for constructing a slide valve to control the solids flow rate.

The apparatus needed for high temperature operation must be amenable to refractory construction, for all the internal parts of the apparatus will be at temperatures above the usable range of common metals. The construction of a conventional fluid catalytic cracking unit from refractory materials would offer further difficulty because of the number and length of the solid transfer lines between adjoining fluid beds. Thus, the present commercial fluid bed systems are not satisfactory for extreme temperature operation. A fluidized solids contacting system is needed which provides separate contacting zones that have a solids transfer means between the contacting zones suitable for extreme temperature operation.

It is a main object of this invention to provide an improved contacting system for effecting conversions with fluidized solids. Other objects of this invention are to provide a high temperature fluidized solids contacting system which is amenable to refractory material construction and does not employ slide valves for controlling solids flow, to provide a high temperature fluidized solids contacting system in which solids flow does not depend on the difference in density between a fluidized solids phase and a high velocity dilute solids lift phase in a transfer zone, to provide a high temperature contacting system which is suitable for the transfer of coarse solids, which deaerate or settle rapidly, between fluidized solids zones, and to provide an apparatus for the conversion of gaseous materials in a fluidized solids phase, such as for the production of hydrogen from hydrocarbons at temperatures between 1100° and 1500° C. and higher.

The objects of this invention are accomplished by a fluidized solids contacting system designed for operation at temperatures that are too high for conventional fluidized bed operations. Separate contacting zones are provided with transfer means for solids flow between contacting zones.

Accordingly, this invention provides an apparatus for contacting fluidized solids which comprises a substantially vertical unitary vessel provided with an outer peripheral wall and having a bottom and a top, an inner partition wall in said vessel which extends vertically from the bottom to the top dividing said vessel into two separate contacting chambers, at least one transfer means in each chamber comprising a passageway in the partition wall near the bottom of the vessel and a downflow solids conduit which extends from said passageway to an intermediate level in the chamber, a distributor for a first gasiform stream at the bottom of the first contacting chamber and an exhaust for gasiform material from the upper part thereof, a separate distributor for a second gasiform fluid at the bottom of the second contacting chamber and a second exhaust for removing gasiform material from the upper part thereof, and an inlet for a gas at a low level in each of said downflow solids conduits for effecting transfer of solids through the said passageway in the partition wall and thereby effecting fluidized solids flow between the said chambers.

At the bottom of each chamber a perforated hearth or the like is the means for distributing a gasiform stream up through the powdered solids at such a rate that the powdered solids are maintained in a dense, fluidized turbulent condition. In the upper portion of each chamber, an exhaust is provided for removing gasiform material therefrom.

The flow of fluidized solids between the two chambers is accomplished by passageways near the bottom of the partition wall between the chambers. The solids pass through each passageway from a downflow solids conduit which extends from the passageway up to an intermediate level in the chamber. When the upper level of the fluidized bed reaches above the height of the downflow solids conduit the fluidized particles spill into the conduit and settle or deaerate to the bottom where the transfer of solids between the chambers occurs. The movement of solids through the passageway is accomplished by a gasiform stream which enters into the bottom of the downflow solids conduit from an inlet located in proximity to the passageway. The flow of gas educts the settled particles from the downflow solids conduit through the passageway in the partition wall and into the bottom of the adjoining fluidized bed. Each chamber has at least one of these downflow solids conduits and passageway transfer means. Between any two chambers, there may be any number of these transfer means.

The transfer of solids is being described in this invention as occurring between two adjoining chambers. By the use of more than one partition, a vessel may be divided into any number of chambers and the solids circulating through the system may be contacted with a variety of separate gas streams. For processes such as the cracking of hydrocarbons, two chambers are ordinarily sufficient, and the solids circulate between them through at least one transfer means in each chamber.

The downflow solids conduit may be in the form of a pipe which is approximately adjacent to the partition wall and which contacts the partition wall at the passageway slot near the bottom of the partition wall. The solids downflow conduit, may also be in the form of a baffle which is attached to the partition wall in such a way that it forms a well and shields the passageway in the partition wall from the fluidized bed up to an intermediate level in the chamber.

In the system of this invention, the direction of solids flow is not determined by the difference in density between a fluidized solids phase and a high velocity, dilute solids lift phase in a transfer zone as in conventional fluidized bed systems, but rather it is determined by the difference in density between a dense, deaerated solids phase in a transfer zone and a fluidized solids phase in an adjoining chamber. The latter density difference allows the solids to transfer quickly and easily.

The rate of solids flow in the system is controlled by the velocity of the gas stream passing through the bottom of the downflow solids conduit into the partition passageway. This is in contradistinction to the conventional fluid bed systems in which valves are used at the bottom of the downcomer pipe to regulate solids flow. The rate of solids flow will also be dependent on the size of the downflow solids conduit and the size of the passageway slot; but for a given downflow solids conduit, the rate of solids flow is determined by the velocity of the transfer gas.

The high density of the deaerated solids phase settled in the downflow solids conduit has other advantages besides ease of the solids transfer. Very little gasiform material from the chamber is entrained with the solids in the conduit. This eliminates the need for a purging operation in most cases. Also, the high density of the solids phase in the conduit prevents transfer gas, or gas from the adjoining chamber, to bypass into the wrong reaction zone.

The transfer of solids by a gasiform stream from the bottom of a downflow solids conduit in the chamber to the bottom of a fluidized bed in an adjoining chamber eliminates the conventional riser pipe or chimney and the high velocity lift phase needed to carry the fluidized solids up the riser pipe to the adjoining fluidized bed. As mentioned previously, erosion in the riser pipe caused by the high velocity lift phase is severe even at temperatures in the 500° to 600° C. range. The use of a riser pipe and high velocity lift phase transfer means are prohibitive at temperatures above 1000° C.

Besides erosion difficulties, the conventional transfer means also is responsible for a high rate of attrition of the solid particles. A high rate of attrition is a serious and costly disadvantage when an expensive catalyst is being circulated.

The solids transfer aspects of this invention are applicable to any process wherein fluidized solids are separately contacted with two or more gasiform streams. The contacting system may be fabricated of metal or a refractory material and the contacting chambers may be separate or in a unitary vessel. Preferably, the contacting system is a unitary system constructed of refractory material for operation at temperatures that are too high for conventional fluidized bed operations.

The conversion system of this invention may be operated at ordinary temperatures and at temperatures up to 2000° C. and higher. The system is especially suitable for circulating coarse solids which settle easily and which are transferred between chambers only with difficulty in conventional units.

The transfer gas through the bottom of the downflow solids conduit may flow continuously or it may be released in intermittent blasts. The force of the transfer gas stream flow is dissipated in the adjoining fluid bed instead of against an easily eroded refractory surface.

It has been found advantageous to construct the downflow solids conduits with a larger cross-section at the top than at the bottom. This reduced the possibility that gasiform material will pass through the solids in the conduit and enter into the wrong contacting chamber.

This invention will be further described with reference to the accompanying drawing and as applied to a process for producing hydrogen from hydrocarbons. Means for introducing and removing solids, and means for heating, heat exchanging, separating solid fines from gases and other modifications, are features which are well understood by those skilled in the art and do not constitute part of this invention.

In the drawing:

Figure 1 is a sectional elevation of a circular, substantially vertical unitary vessel divided into two chambers; and Figure 2 is a sectional plan view taken along line 2—2 of Figure 1.

The unitary reaction vessel shown comprises a substantially cylindrical wall 10 constructed of refractory material such as firebrick and provided with an arched roof construction 11 to avoid the need for metal reinforcement, a vertical partition 12 dividing the unitary vessel into two contacting chambers B and D, and a floor 13.

A gasiform material charge A is introduced through line 20 into space 21, where it is distributed through perforated refractory plate 22 into chamber B. The gasiform charge A enters chamber B at a rate that maintains powdered solids 24 in a fluidized, turbulent condition. The vertical flow of gas passes upward to the top of the vesel where it exits through line 25.

When the level of the bed of fluidized solids 24 is higher than downcomer solids conduit 28, a portion of solids 24 spills into downcomer solids conduit 28 and deaerates and settles to the bottom of conduit 28. Transfer gas 30 passes through line 31 and enters downcomer solids conduit 28 through solids transfer gas jet 32. Transfer gas 30 forces deaerated solids 33 through passageway 35 and into adjoining chamber D.

A second gasiform material, charge C, is introduced through line 36 into space 37 where it is distributed through refractory plate 39 into chamber D. The gasiform charge C enters chamber D at a rate sufficient to fluidize solids 40 in said chamber D. Line 41 at the top of chamber D is used to withdraw the upward flow of gas.

Fluidized solids 40 enter downflow solids conduit 42 and settle to the bottom. Transfer gas 45 passes through line 46 and enters downflow solids conduit 42 through solid transfer gas jet 48. Transfer gas 45 carries deaerated solids 49 through passageway 50 and into adjoining chamber B.

To illustrate the operation of the system at high temperatures, a gasiform hydrocarbon stream, e.g., one containing principally methane and hydrogen, is preheated to a temperature in the range up to 800° C. and introduced through line 20 into space 21, and from there directly into chamber B at a velocity of 0.01 to 10 feet per second superficial velocity or greater. The gas fluidizes a bed of powdered, neutral refractory solids, e.g., silica sand, which is maintained at a temperature between 1100° and 1500° C. The hydrogen-rich gas stream passes upward and is removed through line 25 as a product gas mixture.

The neutral refractory material becomes contaminated with lustrous carbon produced by the decomposition of hydrocarbon material. The contaminated refractory material overflows steadily into downflow solids conduit 28. Air enters downflow solids conduit 28 through gas jet 32 and forces the deaerated refractory material through passageway 35 and into chamber D.

Air, preheated to a temperature in the range up to 800° C., is introduced through line 36 into space 37, where it is distributed through plate 39 into chamber D. The air burns the carbon off the fluidized refractory material and the combustion serves to heat the fluidized solids. The hot, fluidized solids flow into downflow solids conduit 42 and are transferred to chamber B by a gasiform hydrocarbon stream which enters downflow solids conduit 42 through gas jet 48. The circulation of hot, fluidized solids to chamber B supplies the heat of decomposition for the hydrocarbons and maintains chamber B at the desired temperature. The combustion gas in chamber D passes out of the system as flue gas through line 41.

The practice of this invention is not limited by temperature requirements in any way. This system may be operated at the highest temperatures that might conceivably be used for fluid bed operations. This invention may also be practiced under high pressures by enclosing the system in a pressure vessel.

To illustrate the effectiveness of the transfer means of this invention for circulating solids between fluidized beds, the following data is included which is obtained from the operation of a small-scale unit.

The unit is twelve inches in diameter and contains two downflow solids conduits and a partition wall as shown in Figures 1 and 2. A solids transfer gas jet is located in each of the downflow solids conduits to force solids from the wells through the passageway slots in the partition wall. The bottom of the vessel consists of a perforated plate with a gas distributing space beneath it. A silica sand (2 percent, larger than 50 mesh; and 98 percent, larger than 200 mesh) is used as the circulating solids.

One of the chambers is charged with 4000 grams of silica sand which is dyed blue. The other chamber is charged with 4000 grams of white sand. The time for the silica sand in each chamber to reach the same color is measured. The time for complete mixing is four minutes at a gas flow rate of 27 s.c.f./minute (1.25 feet/second superficial gas velocity through each fluid bed) and a transfer gas flow rate of 2.75 s.c.f./minute from each downflow solid conduit jet.

What is claimed is:

An apparatus for contacting fluidized solids which comprises a substantially vertical unitary vessel provided with an outer peripheral wall and having a bottom and a top, an inner partition wall in said vessel which stands vertically from the bottom to the top dividing said vessel into two separate contacting chambers, at least one transfer means in each chamber comprising a passageway in the partition wall near the bottom of the contacting chamber opening directly into the bottom of the second contacting chamber and a downflow solids conduit having an imperforate bottom and extending from said passageway to an intermediate level in the chamber, a distributor for a first gasiform stream at the bottom of the first contacting chamber and an exhaust for gasiform material from the upper part thereof, a separate distributor for a second gasiform fluid at the bottom of the second contacting chamber and a second exhaust for removing gasiform material from the upper part thereof, each of said contacting chambers being free of any obstruction to the free flow of material passing through said passageway across said distributor, and a gas inlet at the same low level as the passageway and at opposite sides relative to the passageway in the partition wall in each of said downflow solids conduits for effecting transfer of solids through the said passageway in the partition wall and thereby effecting solids flow between the said chambers.

References Cited in the file of this patent
UNITED STATES PATENTS
2,521,195   Wheeler _____ Sept. 5, 1950